United States Patent
Chun et al.

(10) Patent No.: US 11,168,805 B2
(45) Date of Patent: Nov. 9, 2021

(54) THERMALLY ACTUATED FLOW CONTROL VALVE

(71) Applicant: Hamilton Sundstrand Corporation, Charlotte, NC (US)

(72) Inventors: Richard K. Chun, Alhambra, CA (US); Wai Tak Lee, Rancho Cucamonga, CA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/934,375

(22) Filed: Jul. 21, 2020

(65) Prior Publication Data

US 2020/0347951 A1     Nov. 5, 2020

Related U.S. Application Data

(63) Continuation of application No. 14/682,174, filed on Apr. 9, 2015, now abandoned.

(51) Int. Cl.
| | |
|---|---|
| *F16K 31/00* | (2006.01) |
| *F16K 37/00* | (2006.01) |
| *F16K 31/02* | (2006.01) |
| *H01J 49/04* | (2006.01) |

(52) U.S. Cl.
CPC .......... *F16K 31/002* (2013.01); *F16K 31/025* (2013.01); *F16K 37/0041* (2013.01); *H01J 49/0495* (2013.01)

(58) Field of Classification Search
CPC .. F16K 31/002; F16K 31/025; F16K 37/0041; H01J 49/0495
See application file for complete search history.

(56) References Cited

U.S. PATENT DOCUMENTS

| | | | | | |
|---|---|---|---|---|---|
| 3,211,414 | A | ‡ | 10/1965 | Webb | G05D 23/024 251/11 |
| 3,719,322 | A | ‡ | 3/1973 | Gifford | G05D 23/026 236/10 |
| 3,833,171 | A | ‡ | 9/1974 | Gifford | G05D 23/024 236/10 |
| 3,967,781 | A | ‡ | 7/1976 | Kunz | F25B 41/062 137/543.23 |
| 4,590,371 | A | ‡ | 5/1986 | Ottley | H01J 49/0404 250/288 |
| 5,676,309 | A | ‡ | 10/1997 | Lee, II | G05D 23/022 236/10 |
| 5,879,594 | A | ‡ | 3/1999 | Holtzman | F02M 7/11 137/79 |
| 6,745,794 | B2 | ‡ | 6/2004 | Gajewski | F16K 1/526 137/59 |
| 6,854,712 | B2 | ‡ | 2/2005 | Rohwer | F16K 31/0651 251/129.05 |

(Continued)

*Primary Examiner* — Daphne M Barry
(74) *Attorney, Agent, or Firm* — Carlson, Gaskey & Olds, P.C.

(57) ABSTRACT

This disclosure relates to a system including a valve, a control unit, and a thermal element. The thermal element is selectively operable in response to instructions from the control unit to control a position of the valve. The control unit is operable in a static mode and a dynamic mode. In the static mode, the valve position is held substantially constant. In the dynamic mode, the valve position is adjusted in response to a valve outlet condition.

20 Claims, 3 Drawing Sheets

(56) References Cited

U.S. PATENT DOCUMENTS

| | | | |
|---|---|---|---|
| 7,707,844 B2 ‡ | 5/2010 | Nestler | F25B 41/062 |
| | | | 62/222 |
| 8,011,390 B2 ‡ | 9/2011 | Stensen | G05D 7/0133 |
| | | | 138/43 |
| 8,205,855 B2 ‡ | 6/2012 | Li | G05D 23/1921 |
| | | | 165/287 |
| 8,680,464 B2 ‡ | 3/2014 | Hashimoto | H01J 49/0013 |
| | | | 250/282 |
| 8,684,660 B2 ‡ | 4/2014 | Miranda | F02C 7/141 |
| | | | 415/17 |
| 8,701,702 B2 ‡ | 4/2014 | Gaillard | G01F 15/063 |
| | | | 137/468 |
| 2011/0162384 A1 ‡ | 7/2011 | Langdon, II | F02C 6/08 |
| | | | 60/782 |
| 2011/0209769 A1 ‡ | 9/2011 | Chun | F03G 7/06 |
| | | | 137/2 |
| 2013/0248020 A1 ‡ | 9/2013 | Thybo | F25B 41/062 |
| | | | 137/50 |
| 2014/0157769 A1 ‡ | 6/2014 | Daly | F03G 7/065 |
| | | | 60/527 |

‡ imported from a related application

THERMALLY ACTUATED FLOW CONTROL VALVE

CROSS-REFERENCE TO RELATED APPLICATIONS

This application is a continuation of U.S. patent application Ser. No. 14/682,174 filed Apr. 9, 2015.

BACKGROUND

This disclosure relates to a valve that provides controlled movement of a valve pin relative to a valve seat through use of materials having distinct coefficients of thermal expansion and a control system to manipulate the temperature of the materials.

Valves are used in many different applications to control the flow of fluids from one location to another. In a typical valve, a valve seat receives a valve pin, and when the valve pin is seated in the seat, fluid flow is blocked from an upstream location to a downstream location. The valve pin is moved relative to the valve seat to allow fluid flow.

Typically, an actuator is provided to move the valve pin. The use of an actuator requires additional components, and is somewhat expensive. Moreover, the actuator may not provide precise movement, or adequate sealing.

SUMMARY

This disclosure relates to a system including a valve, a control unit, and a thermal element. The thermal element is selectively operable in response to instructions from the control unit to control a position of the valve. The control unit is operable in a static mode and a dynamic mode. In the static mode, the valve position is held substantially constant. In the dynamic mode, the valve position is adjusted in response to a valve outlet condition.

These and other features may be best understood from the following drawings and specification.

DETAILED DESCRIPTION

Figure 1:
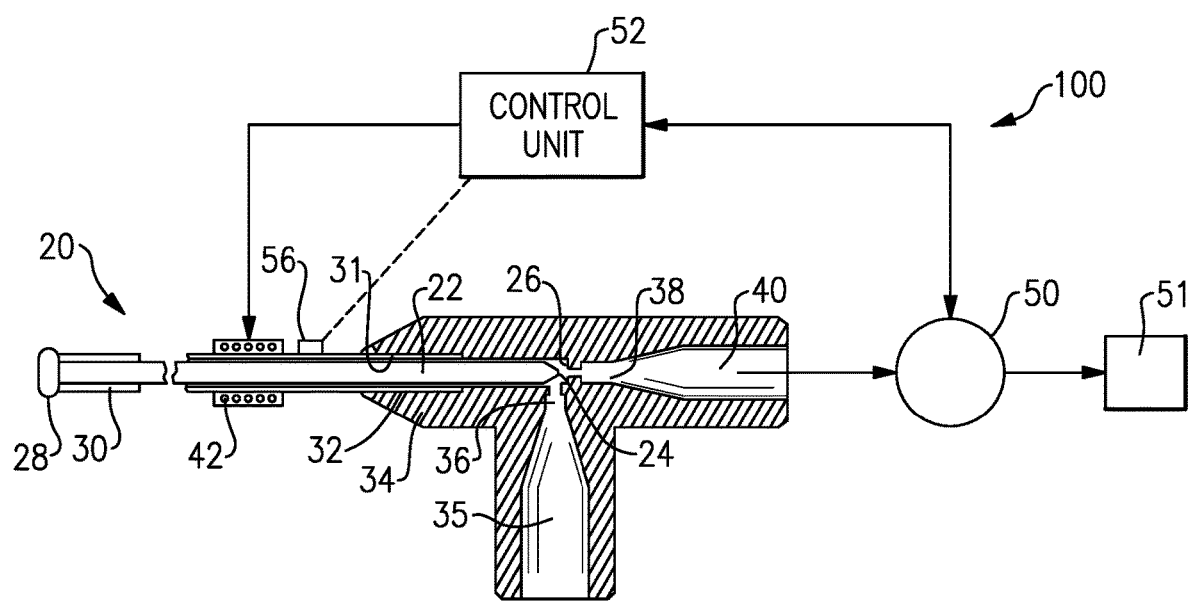
FIG. 1 shows an example system according to this disclosure.

A system 100 comprises a valve 20, shown in FIG. 1, having a valve pin 22. Valve pin 22 has a head 24 that selectively seats in a valve seat 26 to control the flow of a fluid from an upstream location 35, to an upstream port 36, through the valve seat 26, and to a downstream port 38 and a downstream connection 40.

The valve pin 22 is coupled at 28 to a support shell 30. The support shell 30 is received within a bore 31, and coupled at 32 to the housing 34. The couplings at 28 and 32 may be performed by welding or other techniques known in the art. The support shell 30 is formed of a material having a differential coefficient of thermal expansion than the valve pin 22. The difference in the coefficient of thermal expansion may be selected such that the coefficient of one of the materials may be at least twice the coefficient of the other. As will be explained, this will provide significant movement that can be achieved in a relatively short period of time to provide accurate control over the amount of a sample fluid which passes across the valve, as an example.

In one embodiment, the support shell 30 and the housing 34 are formed of a stainless steel. In that same embodiment, the valve pin 22 may be formed of a tungsten. With such materials, the stainless steel support shell 30 will expand with a coefficient of thermal expansion that is three or four times the coefficient of the tungsten valve pin 22.

While the support shell 30 is shown in FIG. 1 as a cylindrical element surrounding a cylindrical valve pin, other embodiments of the support shell 30 which support the valve pin 22 for movement relative to the valve seat 26 can be used. As an example, spaced legs, or even a single support leg may support the valve pin 22 and cause movement of the valve pin 22 relative to the valve seat 26.

Figure 2A:
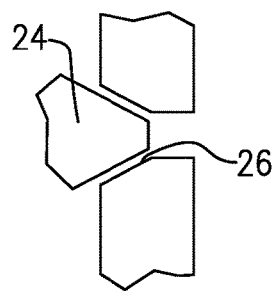
FIG. 2A shows a valve in an open position.
Figure 2B:
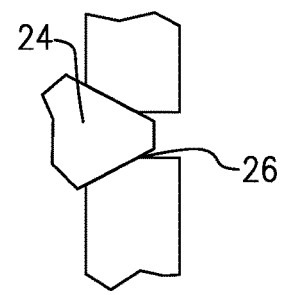
FIG. 2B shows the valve in a closed position.

When the materials mentioned above (e.g., stainless steel and tungsten) are utilized, the support shell 30 will expand more than the valve pin 22 when expanded to heat (and contract more if cooled). Since the two are connected together, this will cause the valve pin 22 to move to the left relative to its FIG. 1 position. Thus, head 24 moves to an open position such as that shown in FIG. 2A, wherein the valve 20 allows fluid flow. When the valve pin 22 moves to the right relative to the FIG. 1 position, the head 24 moves towards a closed position as shown in FIG. 2B, in which fluid flow is restricted.

A thermal element 42 may be provided to drive the expansion. In one example, the thermal element 42 is a heater. In another example, the thermal element 42 is a cooler. Further, the thermal element 42 may be selectively operable as both a heater or a cooler. In the example where the thermal element 42 is a cooler, the coefficients of thermal expansion could be selected such that when the thermal element 42 causes a temperature decrease, the support shell 30 has a coefficient of expansion less than that of the valve pin 22.

The present disclosure is capable of achieving very precise movement of the valve pin 22 by means of a control unit 52, such that variable amounts of fluid can be metered between ports 36 and 38. The present disclosure is also capable of maintaining valve position (e.g., the relative position of the valve pin 22 and the valve seat 26) substantially constant.

The control unit 52 may be any known type of controller including memory, hardware, and software. The control unit 52 is configured to store instructions, and to provide instructions to the various components of the system 100. The control unit 52 may include one or more components in electronic communication with the valve 20. The control unit 52 is operable to receive a signal from a valve sensor 50 (discussed below) and to provide instructions based on that signal. In particular, the control unit 52 selectively controls the movement of the valve pin 22 by controlling the valve temperature through the thermal element 42.

In an example of this disclosure, a valve sensor 50 is placed in the downstream connection 40. The downstream connection 40 may be connected to different devices. As one example, the device may be a vacuum chamber 51 with an ion source. The valve sensor 50 detects an outlet condition of the fluid downstream of valve 20. In one example, the condition at the valve outlet is an outlet pressure, in which case the valve sensor 50 is a known type of pressure sensor.

In another example, the condition at the valve outlet is an outlet flow rate, in which case the valve sensor 50 is a known type of flow meter. In either case, the control unit 52 receives signals from the valve sensor 50. The control unit 52 then provides instructions to the thermal element 42 consistent with the appropriate operational mode (discussed below).

Figure 3:
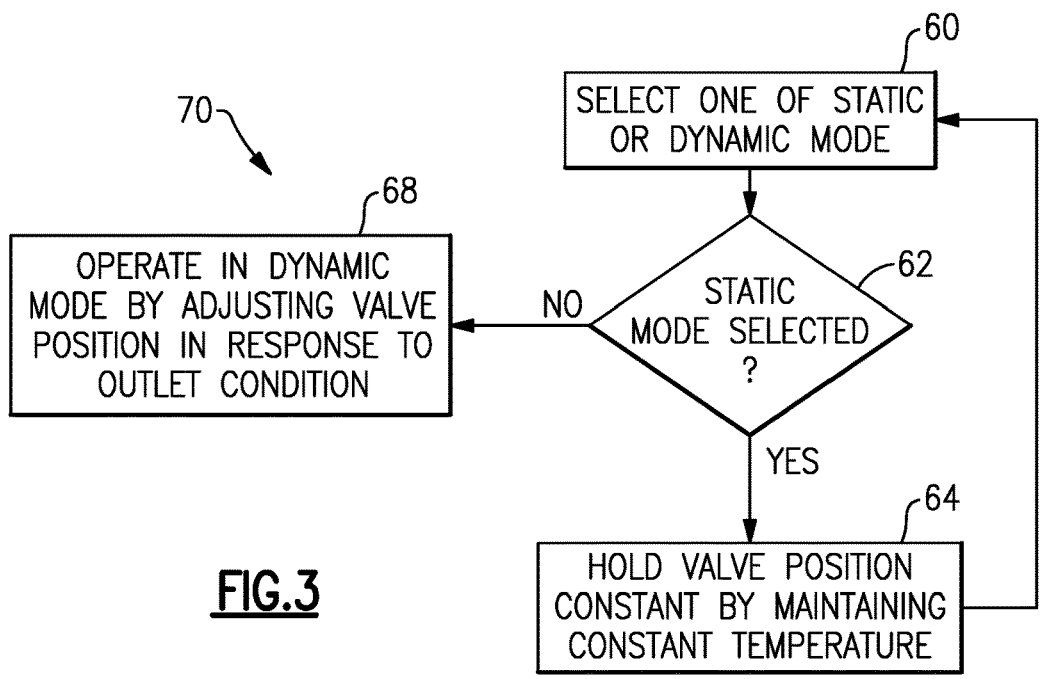
FIG. 3 is a flowchart representative of an example method of controlling the valve.

The control unit 52 is operable in at least two modes in this disclosure. With joint reference to FIGS. 1 and 3 (which shows an example flow chart, or a method of control 70), one of a dynamic mode and a static mode is selected at step 60. If the static mode is selected at step 62, the temperature of the valve 20 is held substantially constant by the thermal element 42, at 64. In that case, the control unit 52 provides instructions to the thermal element 42 to keep a constant temperature of the valve 20. In order to do so, in one example, the control unit 52 is in communication with a temperature sensor 56. In one example, the temperature sensor 56 is placed on the support shell 30. In this way, a constant flow rate of the fluid is achieved regardless of ambient temperature of valve 20.

If the static mode is not selected at 62, the control unit 52 is operable in a dynamic mode. In the dynamic mode, valve position is adjusted in response to the outlet condition from the valve sensor 50, at 68. The flow rate of the fluid can be varied by adjusting the temperature of the valve 20 and, in turn, adjusting the relative position of the valve pin 22 and the valve seat 26.

Figure 4:
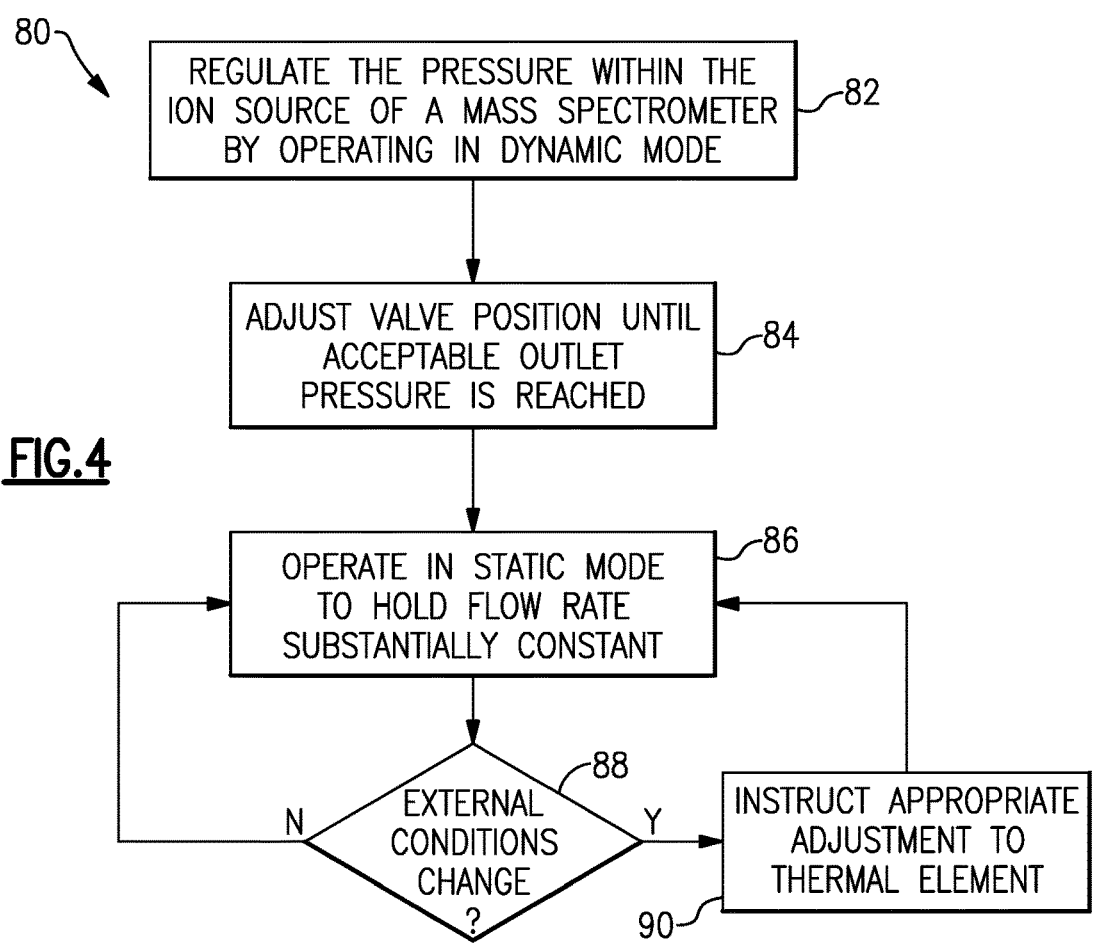
FIG. 4 is a flowchart representative of an example in which the disclosed valve is used with a mass spectrometer.

While the system 100 has many applications, in one particular application the valve 20 is used in connection with a mass spectrometer. FIG. 4 is a flow chart 80 illustrating a method wherein the valve 20 is used to regulate the pressure within an ion source of a mass spectrometer, and then used to run tests with the mass spectrometer. In the method, the control unit 52 is operable in the dynamic mode to calibrate the mass spectrometer, at 82. In that case, the valve sensor 50 would be a pressure sensor. As the pressure of the fluid varies, the control unit 52 provides corresponding instructions to the thermal element 42. Mass spectrometers operate within a particular pressure range. Thus, the instructions provided by the control unit 52 vary the gas pressure until it reaches an acceptable level, at 84.

Continuing with the above example, once an acceptable pressure level is reached, the valve 20 is then operated in the static mode, at 86, to conduct a sample test, for example. In the static mode, the goal is to achieve a substantially constant flow rate during the test. To achieve the substantially constant flow rate, conditions external to the valve 20 are monitored at 88. In one example, the control unit 52 monitors the temperature of the valve 20 for changes in temperature in response to a signal from the temperature sensor 56. If, for example, the external conditions have changed (e.g., the air conditioning in the testing lab has turned on, a door to the testing lab has been opened, or the upstream pressure changes), then the control unit 52 instructs an appropriate adjustment to the thermal element 42, at 90, to maintain the substantially constant flow rate. In this way, the system 100 is capable of regulating the pressure within an ion source regulating the pressure within an ion source of a mass spectrometer (e.g., in the dynamic mode) and being used during a test (e.g., in the static mode).

Figure 5:
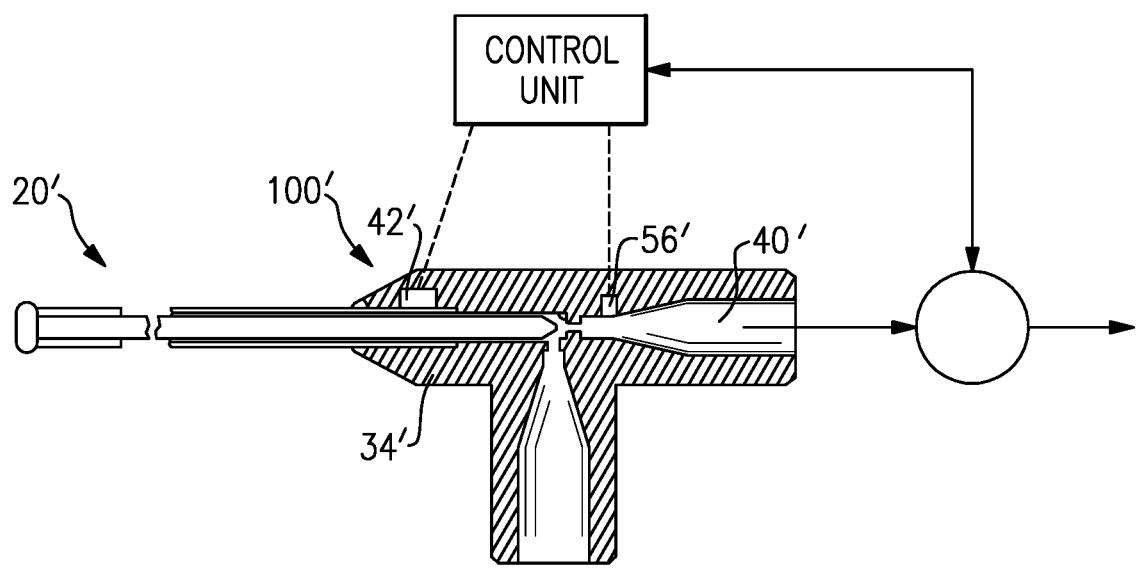
FIG. 5 shows another embodiment of the example system in which a thermal element is positioned in the valve.

FIG. 5 shows a second example system 100' which substantially corresponds to the system 100 of FIG. 1. The system 100', however, includes a thermal element 42' positioned within the housing 34' of the valve 20', and in particular in the downstream connection 40'. This disclosure is not limited to any particular thermal element location, as long as the thermal element can effectively influence valve position.

The term "substantially" is interpreted consistent with the definition "for the most part" and specification does not provide a standard for measuring the precise boundaries of that term of degree. However, the term should be interpreted in the way one skilled in the art would interpret the term.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system, comprising:
 a valve;
 a control unit;
 a thermal element selectively operable in response to instructions from the control unit to control a position of the valve;
 wherein the valve includes a valve pin and a support shell, and wherein the valve pin and the support shell are formed of different materials, each having a different coefficient of thermal expansion;
 wherein, when in the static mode, the control unit provides instructions to the thermal element to maintain the valve at a substantially constant temperature to achieve a substantially constant flow rate regardless of the valve outlet condition;
 wherein the thermal element is located at one of (1) a location within a housing of the valve and (2) a location adjacent to the support shell and the valve pin; and
 wherein the valve is movable between an open position where it is spaced from a valve seat, and a closed position wherein it sits against said valve seat, and when in said open position, is operable in one of (1) a static mode where valve position is held substantially constant and (2) a dynamic mode where valve position is adjusted in response to a valve outlet condition.

2. The system as set forth in claim 1, further comprising a sensor configured to generate a signal indicative of the valve outlet condition, the control unit providing instructions to the thermal element in response to the signal from the sensor when in dynamic mode.

3. The system as set forth in claim 2, wherein the valve outlet condition is one of (1) an outlet pressure and (2) an outlet flow rate.

4. The system as set forth in claim 3, wherein the system includes a mass spectrometer.

5. The system as set forth in claim 4, wherein the control unit is operable in the dynamic mode to regulate the pressure within an ion source of a mass spectrometer, and wherein the control unit is operable in the static mode to regulate fluid flow rate.

6. The system as set forth in claim 1, wherein a temperature sensor is placed near the valve.

7. The system as set forth in claim 1, wherein the valve outlet condition is one of (1) an outlet pressure and (2) an outlet flow rate.

8. The system as set forth in claim 1, wherein the system includes a mass spectrometer.

9. The system as set forth in claim 8, wherein the control unit is operable in the dynamic mode to regulate the pressure within an ion source of a mass spectrometer, and wherein the control unit is operable in the static mode to regulate fluid flow rate.

10. A method, comprising:
(a) operating a thermal element to control a position of a valve;
(b) holding the valve position substantially constant when in a static mode; and
(c) adjusting the valve position in response to a valve outlet condition when in a dynamic mode;
wherein the valve includes a valve pin and a support shell, and wherein the valve pin and the support shell are formed of different materials, each having a different coefficient of thermal expansion;
wherein, when in the dynamic mode, a control unit instructs the thermal element to adjust the valve position based on the valve outlet condition; and
wherein the valve is movable between an open position where it is spaced from a valve seat, and a closed position wherein it sits against said valve seat, and when in said open position, is operable in one of (1) a static mode where valve position is held substantially constant and (2) a dynamic mode where valve position is adjusted in response to a valve outlet condition.

11. The method as set forth in claim 10, wherein, when in the static mode, a control unit instructs the thermal element to maintain the valve at a substantially constant temperature to achieve a substantially constant flow rate regardless of the valve outlet condition.

12. The method as set forth in claim 11, wherein the valve outlet condition is one of (1) an outlet pressure and (2) an outlet flow rate.

13. The method as set forth in claim 12, further including a mass spectrometer and a control unit, wherein the control unit is operable in the dynamic mode to regulate the pressure within an ion source of a mass spectrometer, and wherein the control unit is operable in the static mode to regulate fluid flow rate.

14. The method as set forth in claim 10, further including a mass spectrometer and a control unit, wherein the control unit is operable in the dynamic mode to regulate the pressure within an ion source of a mass spectrometer, and wherein the control unit is operable in the static mode to regulate fluid flow rate.

15. A system, comprising:
a valve;
a control unit;
a thermal element selectively operable in response to instructions from the control unit to control a position of the valve; and
wherein the valve is movable between an open position where it is spaced from a valve seat, and a closed position wherein it sits against said valve seat, and when in said open position, is operable in one of (1) a static mode where valve position is held substantially constant and (2) a dynamic mode where valve position is adjusted in response to a valve outlet condition;
wherein the system includes a mass spectrometer;
said control unit being operable in said dynamic mode to regulate a pressure within an ion source for said mass spectrometer, and wherein said control unit is operable in said static mode to regulate fluid flow rate to said mass spectrometer, said control unit operating by providing instruction to said thermal element to actuate said thermal element and change the position of the valve to achieve said dynamic mode and said static mode;
wherein the valve includes a valve pin and a support shell, and wherein the valve pin and the support shell are formed of different materials, each having a different coefficient of thermal expansion and said thermal element changing a temperature of at least one of said valve pin and support shell to adjust the valve position;
wherein said control unit receiving a pressure sensor signal for measuring a pressure within said ion source in said dynamic mode, and providing instruction to said thermal element to adjust a position of said valve to calibrate said mass spectrometer, until said pressure reaches an acceptable level, at which time the static mode is entered; and
wherein said control unit is operable to attempt to achieve a constant flowrate in the static mode, by monitoring a condition external to said valve, and adjust a signal to said thermal element as said condition external to said valve changes to attempt to maintain the constant flowrate; and
wherein the valve outlet condition is one of (1) an outlet pressure and (2) an outlet flow rate.

16. The system as set forth in claim 15, wherein a temperature sensor is placed near the valve.

17. The system as set forth in claim 15, wherein the valve outlet condition is one of (1) an outlet pressure and (2) an outlet flow rate.

18. The system as set forth in claim 15, wherein the system includes a mass spectrometer.

19. The system as set forth in claim 15, wherein the control unit is operable in the dynamic mode to regulate the pressure within an ion source of a mass spectrometer, and wherein the control unit is operable in the static mode to regulate fluid flow rate.

20. The system as set forth in claim 15, wherein the system includes a mass spectrometer.

* * * * *